Feb. 4, 1930.   O. HEGSTAD   1,746,038
TAPPING ATTACHMENT FOR LATHES
Filed Sept. 27, 1926   3 Sheets-Sheet 1
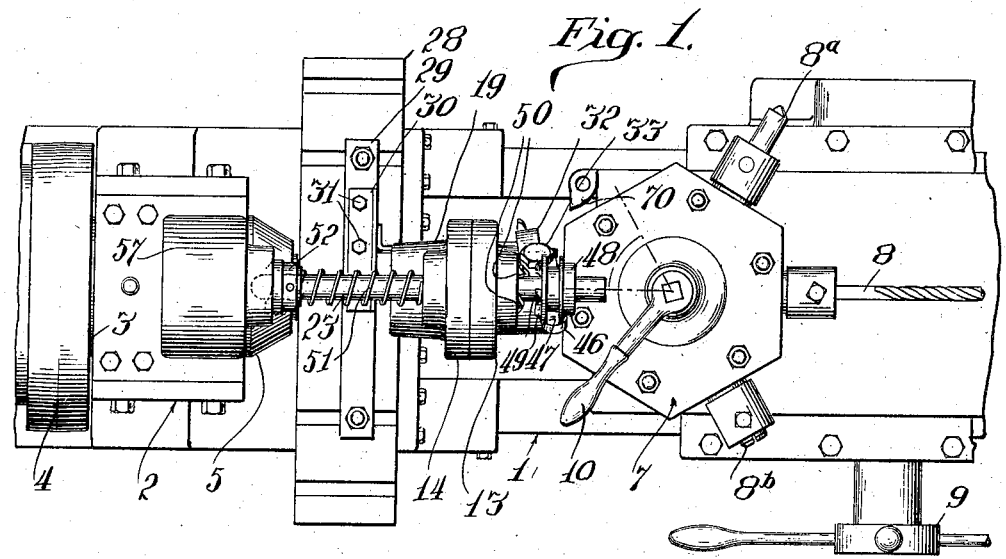
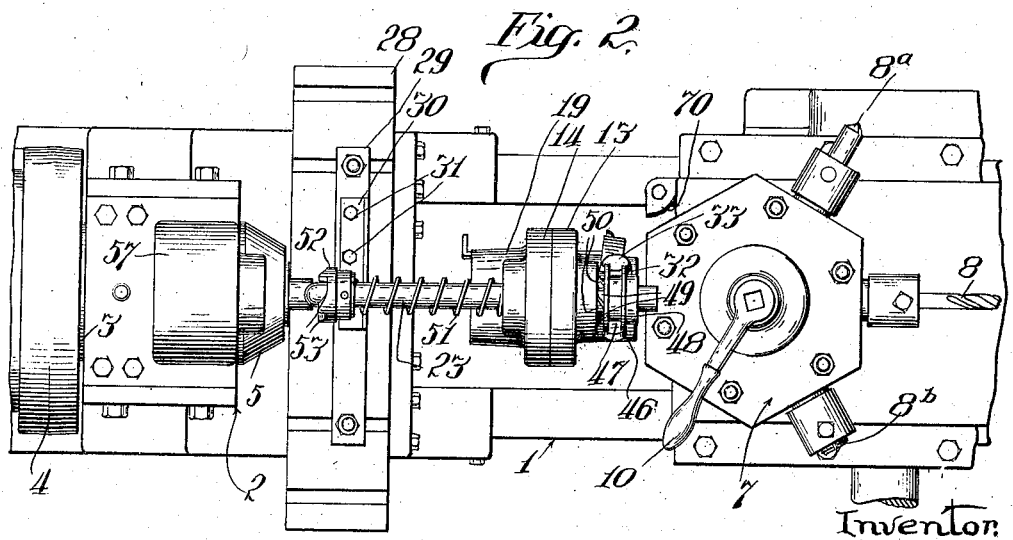
Inventor
Olaf Hegstad
By Daniel J Brennan
Attorney

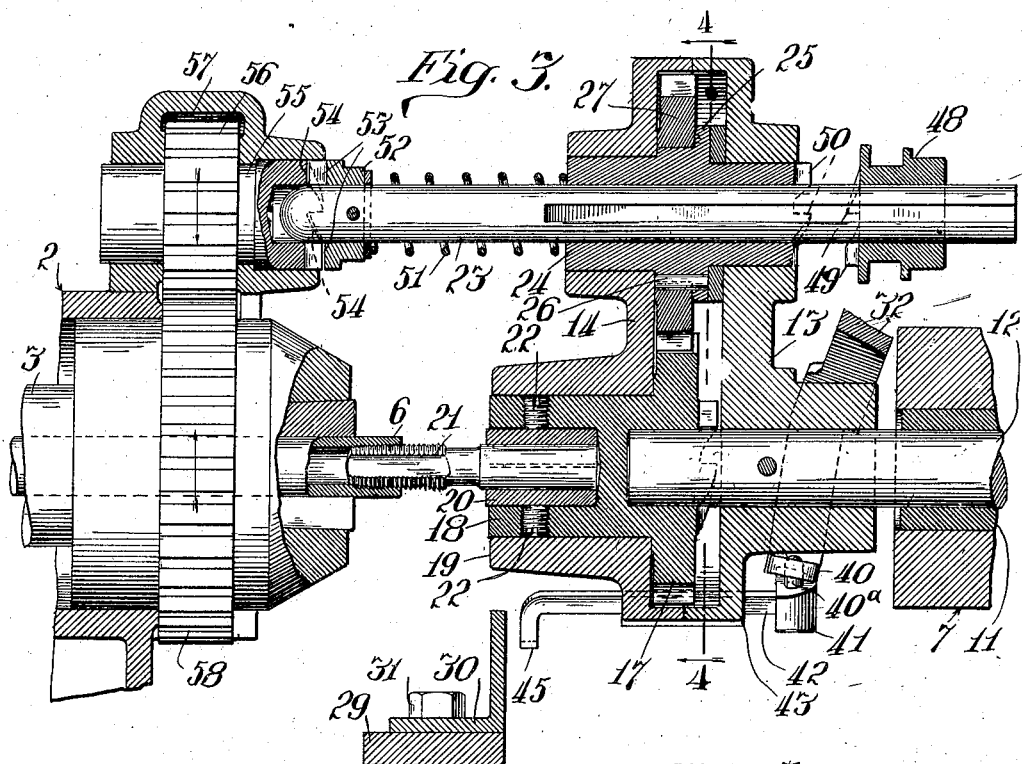
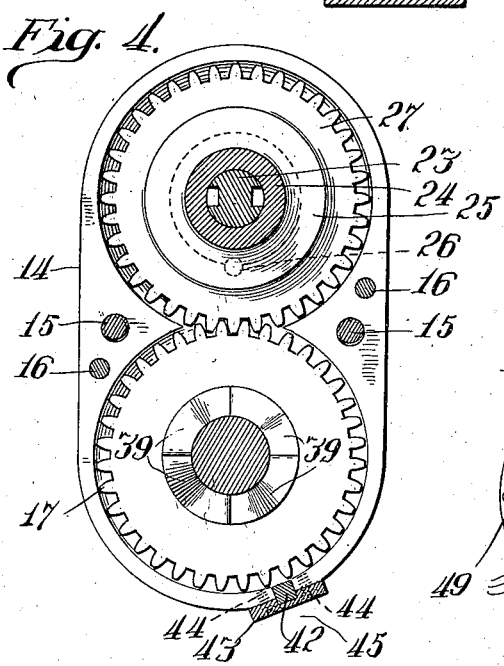
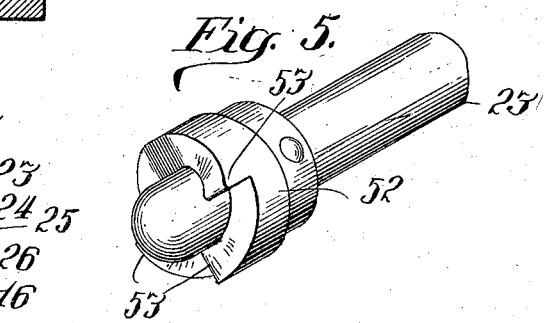
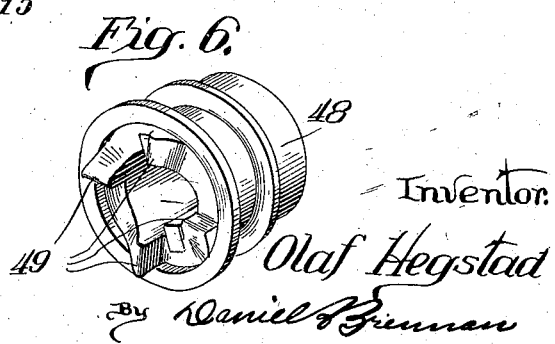

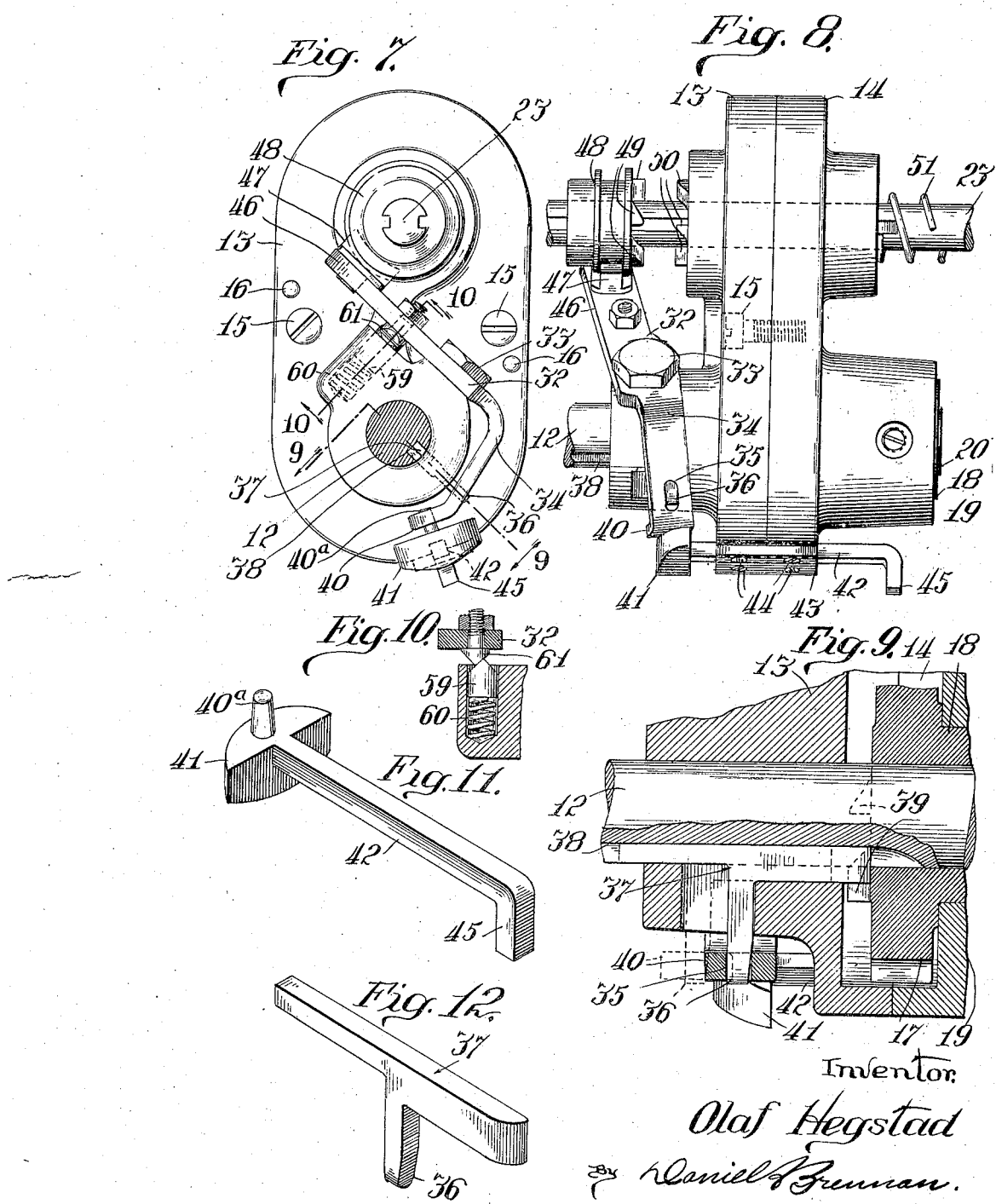

Patented Feb. 4, 1930

1,746,038

UNITED STATES PATENT OFFICE

OLAF HEGSTAD, OF CHICAGO, ILLINOIS, ASSIGNOR TO NICOUD MANUFACTURING CO., A CORPORATION OF ILLINOIS

TAPPING ATTACHMENT FOR LATHES

Application filed September 27, 1926. Serial No. 138,092.

The invention relates to improvements in tapping attachments for lathes, and particularly to tapping attachments adapted for attachment to lathes in which the work is positively rotated, during the tapping operation, and the tap held in such attachment against rotation and gradually advanced into the bore of the work to cut the screw threads therein.

In lathes of known construction it is usually necessary to stop the lathe and to rotate the work in a direction opposite to the previous direction of rotation for the purpose of withdrawing the tap after it has cut the threads to the desired depth, whereby the tap is gradually unscrewed from the threaded opening thus produced.

It is an object of the present invention to avoid the necessity of stopping the work, or rotating the same in a direction opposite to the direction in which it is rotated during the tapping operation, and to effect the easy withdrawal of the tap by imparting to the tap a rotary movement relatively to the work, and in such direction, that the tap will be unscrewed automatically from the threaded bore.

It is also an object of the invention to provide a lathe attachment in which, during the tapping operation, that the tap is positively locked against rotation, but during the tap releasing operation that the tap is rotated at a higher rate of speed without changing the direction of rotation of the work, thereby producing the unscrewing operation of the tap and at the same time axially withdrawing it from the work.

The invention also has the object of providing a tapping attachment for lathes, in which the operation of withdrawing the tap from the threaded bore is started automatically after the tap has advanced to a selectively predetermined depth into the bore to be threaded.

The invention also has the object of producing a relative rotary movement between the tap and work, for the purpose of effecting the withdrawal of the tap without necessitating the interruption of, or the changing of the direction of rotating of the work, and to accomplish this rotation of the tap from the drive through which the work is being rotated.

Another object of the invention is to provide a tapping attachment for lathes, particularly for turret lathes, in which, subsequent to the automatic withdrawal of the tap from the finished bore, effected without interrupting the rotation of the work, the mechanism controlling this withdrawal, is automatically placed into readiness for the next operation through the rotation of the turret.

With these and numerous other objects in view, an embodiment of the invention is described by way of example only in the following specification, and is illustrated in the accompanying drawings, but it is only intended to be limited by the scope of the claims and the spirit of the real invention disclosed.

In the drawings:

Fig. 1 is a top plan view of a portion of the turret lathe showing the invention, the turret being advanced towards the work;

Fig. 2 is a similar top plan view with the turret in position withdrawn from the work;

Fig. 3 is a longitudinal sectional view shown with certain parts in elevation to illustrate the reverse actuating mechanism;

Fig. 4 is a sectional view of gearing on line 4—4 of Fig. 3;

Fig. 5 is a fragmentary perspective view of a clutch carrying spindle;

Fig. 6 is a perspective view of a movable clutch member for said spindle;

Fig. 7 is an end elevation, partly in section, of the turret attachment;

Fig. 8 is a side elevation of said attachment;

Fig. 9 shows on a larger scale a section on line 9—9 of Fig. 7;

Fig. 10 is a detail sectional view on line 10—10 of Fig. 9;

Fig. 11 shows perspectively a key actuating tappet for the attachment, and

Fig. 12 shows perspectively the movable key or abutment element for the gearing.

In Figs 1 and 2, only the principal portions of the turret lathe parts that are relevant to the present invention are illustrated. The bed 1 of the lathe supports at one end a suitable bearing or head stock 2 for a shaft 3 (Fig. 3) which may be driven by the pulley 4. This shaft is associated with a chuck 5 in which the work 6 is held so as to be rotated together with the chuck. A turret 7, shown here to be of polygonal outline and adapted to support in a known way the various tools 8, $8^a$, $8^b$, etc., is adapted to movement in a rectilinear path towards and away from the chuck by mechanism which is not fully illustrated in the drawings, but which may be of any conventional form, such as is generally used on lathes of this type. The hand wheel 9 may serve for manually actuating the turret 7 and for bringing the desired tool mounted thereon into operative position relatively to the work, while the handle 10 mounted on the turret itself may be used for selectively bringing any tool on the turret in proper operative position relatively to the work.

As it is necessary in tapping operations to either reverse the rotation of the tap or work relatively to the other to withdraw the tap, the present turret is equipped with a special attachment which may be used to automatically accomplish the same end, but instead of securing an ordinary work holder within the turret 7 to which the tap is to be secured, there is operatively associated with the turret, as for instance by means of the chuck 11, a nonrotatable or stationary stem on shaft 12 which serves as a mounting for the tapping attachment.

The attachment comprises a casing which consists in the embodiment illustrated of two portions or casings 13 and 14 securely held to each other by bolts or counter-sunk filister head cap screws 15 and maintained in proper aligned position by dowel pins 16 or in any other appropriate way. The rear portion or section 13 of said casing is fixedly secured to the stationary shaft or stem 12, and the lower part of the front portion of the casing receives rotatably therein a gear wheel 17 having an extended hub 18 which is carried by the bearing extension 19 of the casing portion or part 14. Removably secured within the hub extension 18 of the gear 17 a chuck or sleeve 20 is mounted adapted to receive the tapping tool 21. This chuck 20 is fixedly held in the hub 18 by headless set screws 22. The casing formed of the two parts 13 and 14 receives in its upper portion a spindle 23 on which is loosely or rotatably mounted a bearing sleeve 24, this bearing sleeve being provided with a flange 25 through which one or more dowel pins 26 project axially, to maintain in fixed connection with the bearing sleeve 24 a ring gear 27 preferably having the same diameter as the gear 17 in the lower portion of the casing, or the gear may be made integral with said sleeve, the two gears being arranged to mesh with each other as indicated in Fig. 4 of the drawings.

The bed 1 of the lathe also carries a transverse support 28 to which a tool post or the like, not shown in the drawing, may be secured, for the purpose of finishing the work held in the chuck 5. In the embodiment illustrated a transverse bar 29 is mounted on the support 28, and a stop 30 in the form of an angle bar is removably secured to the bar 29 by means of the screws 31. It is obvious that the support 28 may be adjusted longitudinally as well as transversely of the lathe in the ordinary way, and that on this support 28 the stop carrier 29 may also be adjusted axially as well as transversely of the lathe and may then be held in the desired adjusted position.

The attachment for the tapping operations is provided with means for effecting relative movement of the tool 21 with respect to the work 6 to cause automatically the withdrawal of the tapping tool from the work.

As will be seen in Figs. 7 and 8, an extension on the casing section 13 is provided with a lever 32 which is pivotally secured to said extension by means of the screw 33. One arm of the lever 32 is angularly offset, as indicated at 34, and has intermediate the pivot and its end an opening 35 through which the stem 36 of a movable key 37 projects, said key being slidably mounted in a key way 38 on the stationary shaft 12, which serves in place of the ordinary turret tool holder.

In the normal position of said key 37, which is the position for tapping the work, one end of the key projects against and in engagement with one of a plurality of clutch teeth 39 which are formed on the rear face of the gear 17, thereby maintaining said gear against rotation on the stem, and as the gear is fixedly associated with the tapping tool 21 by the screws 22, as shown in Fig. 3, it is obvious that the locking key 37 will normally prevent the rotation of said gear 17, and will thereby also fixedly hold the tapping tool 21 against rotation. Owing to the rotation of the work 6 and the rectilinear advance of the tap into the bore 6' of the work 6, the tapping operation will be carried out.

The offset extremity 40 of the arm 34 is provided with an opening in which the pin $40^a$ is received. This pin is mounted on the head 41 of a dog 42 movably secured to the casing sections 13, 14, as indicated in Fig. 4. The casing is equipped for this purpose with a guide plate 43 grooved to receive slidably the dog 42 and secured to the casing by means of suitable screws 44. The hook 45 at the other end of the dog 42 is adapted for cooperation with the stop 30, and upon engagement of the hook with said stop 30 during the advance of the tool into the work, the dog 42 will be displaced relatively to the casing, thereby causing the lever 32 to be rocked about its pivot 33.

The opposite arm 46 of the lever 32 carries at its free end a lug 47 in movable engagement with a clutch member 48 which is splined to the spindle 23 and which upon oscillation of the lever 32 in a predetermined direction may be advanced on said spindle towards the left (Fig. 3) to move the clutch teeth 49 on said sleeve 48 into engagement with corresponding clutch teeth 50 on the hub member 24 which is rotatably supported in the casing sections 13 and 14 on the spindle 23. The spindle 23 extending rotatably through said hub member 24 is surrounded by a spring 51 which is interposed between the front face of the hub member 24 and a clutch head 52 securely fastened near the front of the spindle. This clutch head terminates in a face provided with clutch teeth 53 adapted for cooperation with suitable clutch teeth 54 on a hub extension 55 of a gear 56 mounted in a bearing casing 57 which is secured to the frame of the machine. The gear 56 is of smaller diameter than and is in permanent mesh with a gear 58 which is operatively associated with the chuck 5 in any suitable way and, therefore, during the operation of the machine it is normally rotated at a greater speed than that at which the chuck 5 is rotated preferably a ratio of 1 to 2.

A yielding stop in the form of a spring controlled plunger 59 is mounted in that extension of the casing portion 13 to which the lever 32 is pivotally secured. The top of the plunger 59 is normally forced to project outward by the spring 60 and is beveled in opposite directions, as indicated in Fig. 10. A pin 61 adapted for cooperation with the beveled faces of the plunger 59 is secured to the lever 32 whereby upon the forcible oscillation of said lever from one side of the stop pin 59 to the other side the accidental return oscillation of the lever is prevented.

The operation of the device may be briefly described as follows:

The attachment comprising the casing sections 13 and 14 with the gearing contained therein is secured to the shaft or stem 12 of the turret 7, in the place provided for holding a tool. This attachment contains the tap 21 which remains stationary while the work 6 is being rotated by the pulley 4 and the chuck 5. During the advance of the turret 7 toward the work, the attachment is thereby fed toward the head stock 2 of the lathe and owing to this advance the tap cuts the thread in the bore of the rotating work piece 6. The spindle 23 with its rounded end gradually enters the socket of the hub extension 55 of the gear 56, and owing to the engagement of the clutch teeth 53 with the clutch teeth of the extension rotation may be imparted to the spindle 23; while at the same time, owing to the axial advance of the attachment relatively to the head stock 2, the spring 51 will be compressed. The hub member 24 loose on the spindle 23 will be held against rotation, as this hub member is fixed to the gear 27 which is in engagement with the gear 17 of equal diameter, the last named gear being locked against rotation by the key 37.

After the turret attachment has sufficiently advanced to effect the tapping operation to the desired depth, the dog 42 by means of the depending hook 45 engages the stop 30, thereby initiating a displacement of said dog relatively to the casing and causing the lever 32 to swing over, overcoming the spring actuated stop plunger 59. This rocking movement of the lever rapidly withdraws the locking key 37 out of its locking position relatively to the teeth 39 of the gear 17, so that rotation of said gear may now freely take place.

At the same time the opposite arm 46 of the lever 32 moves the clutch sleeve 48 along its feather way to operative position with respect to the teeth 50 of the hub member 24, and since the clutch sleeve is rotated by the spindle 23 at twice the rate of speed of the chuck 5, this drive will now be imparted to the gear 27 and from said gear to the gear 17, whereby the tap 21 is rotated in the same direction as the work but at a higher rate of speed.

A relative rotation, therefore, of the tap with respect to the work takes place in a direction whereby the tap is automatically unscrewed from the tapped opening just produced in the work.

This withdrawal of the tap from the finished bore may be aided by the withdrawal of the slide in which the turret is mounted in a direction away from the work although this is not usually necessary. During this movement of the slide, for instance, from the position illustrated in Fig. 1 to the position shown in Fig. 2, the entire attachment comprising the casing sections 13 and 14 and the elements carried thereby will also be withdrawn. Owing to the withdrawal of the entire attachment away from the work, the spring 51 surrounding the front portion of the countershaft 23 will exert a pressure between members 52 and 24 thereby keeping clutch teeth 53 and 54 in operative engagement.

The dog 42 which has been moved into one end position owing to its engagement with the stop 30 will remain in this end position, so that the key 37 normally locking the gear 17 associated with the tap is released, and the gear free to rotate, but since the countershaft 23 is out of clutch relation with the driven gear 56, no rotation will be transmitted to this gear 17 or the tap 21, therefore, they will remain stationary.

The lever 32 having been swung into a position in which it moved the clutch sleeve 48 to operative engagement with the teeth 50 of the hub member 24, will remain in this position, as shown in Fig. 2, since the yielding stop 59 prevents the return rocking movement of said lever.

If subsequent to the axial withdrawal of the tool from the work, a rotative step is given to the turret, as for instance by means of the handle 10, the head 41 of the dog 42 will come into engagement with a lug 70 which is secured to the slide on which the turret carrying the support for the tap is mounted, and owing to this rotary movement of the cam 41 about the axis of the turret, this lug will produce a cam effect upon the head 41 of the dog thereby shifting said dog from the position which it occupies into the position shown in Fig. 1, an operation which will also induce the lever 32 to rock on its pivot 33 against the tension of the yielding stop 59. The parts are then all in readiness for the next withdrawal operation of the tap, and upon approach of the tap to the work, the operation can again be performed.

I claim:

1. A tapping attachment for lathes having a drive shaft for the work and a support for a tap, said support being movable axially of the work, including a countershaft driven from said drive shaft, a train of transmission gears between said countershaft and the tap, and key means on the support of the tap for engaging in and positively locking one of the gears in said train of transmission gears against rotation during the tapping operation.

2. A tapping attachment for lathes having a drive shaft for the work and a support for the tap movable axially of the work, including a countershaft driven from said drive shaft, a gear loose on said countershaft, a gear in fixed relation to the tap, and means on the support for positively connecting said first named gear with said countershaft, said first and second gear being in engagement with each other.

3. A tapping attachment for lathes having a drive shaft for the work and a support for the tap movable axially of the work, a countershaft driven from said drive shaft, a gear loosely mounted on said countershaft, a second gear in engagement therewith and fixedly connected to the tap, means on the support for automatically locking one of said gears against rotation, and means on the support for operatively connecting said first named gear with said countershaft.

4. A tapping attachment for lathes having a drive shaft for the work and a support for the tap movable axially of the work, including a countershaft driven from said drive shaft, a gear loosely mounted on said countershaft, a gear fixedly associated with the tap, means on the support for normally locking said second gear against rotation, and means for releasing said lock from said second gear and for operatively connecting the first gear with said countershaft.

5. A tapping attachment for lathes having a drive shaft for the work and a support for the tap axially movable of the work, a countershaft adapted to be driven from the drive shaft, a gear loosely associated with said countershaft, a second gear in mesh with said first named gear and fixedly associated with the tap, means on the support for normally locking said second gear against rotation, and means on the support for simultaneously unlocking said second gear and for operatively connecting the first named gear with said countershaft.

6. A tapping attachment for lathes having a drive shaft for the work and a support for the tap axially movable of the work, a stop on the lathe adapted to limit the axial movement of the support in direction towards the work, a secondary shaft adapted to be driven from said drive shaft, a gear loosely associated with said second shaft, a second gear in engagement with said first named gear and fixedly associated with the tap, and means on the support operable upon engagement with said stop on the lathe for rapidly establishing operative connection between said first named gear and said second shaft to impart rotary movement to the tap.

7. A tapping attachment for lathes having a drive shaft for the work and a support for the tap axially movable of the work, including a pair of gears, one fixedly associated with the drive shaft and the other one permanently driven by said first gear, a countershaft loosely carried by the support and axially slidable therein, a releasable clutch connection between said second gear and said countershaft, a third gear loosely mounted on said countershaft and carried by the support of the tap, a fourth gear fixedly associated with the tap and in mesh with said third gear, and means for effecting a fixed connection between said third gear and the countershaft subsequent to the establishment of the clutch connection between the countershaft and the second named gear, said means being operable automatically upon the support having been advanced to a predetermined point in its advance towards the work.

8. A tapping attachment for lathes having a drive shaft for the work and a support for the tap movable axially of the work, comprising a pair of gears one of which is fixedly associated with the drive shaft while the other one is in mesh with said first named gear, a countershaft loosely rotatable in the support, a gear in the support rotatable on said countershaft, another gear in the support in mesh with the third named gear and fixedly associated with the tap, and means for successively establishing a clutch connection between said countershaft and said second gear, and between said third gear and the countershaft.

9. A tapping attachment for lathes of the type in which a drive shaft permanently rotates the work while a support for the tap is movable axially of the work, comprising a larger gear permanently associated with the drive shaft, a smaller gear in engagement with said first named gear and driven thereby, a countershaft loosely rotatable in the support and slidable therein, a pair of gears in said support and in mesh with each other, one of said gears being loosely associated with said countershaft and the other one being fixedly associated with the tap, means for normally locking said last named gear against rotation during the advance of the support in direction towards the work, a clutch between said countershaft and the second named gear, another clutch between said countershaft and the third gear, and means for successively moving said clutches to operative position during the advance of the support towards the work, the means for rendering the second named clutch opeartive being actuated automatically upon the support arriving at a predetermined point in its path during the advance towards the work.

10. A tapping attachment for lathes having a drive shaft for the work and a support for the tap movable axially of the work, a train of transmission gears between said drive shaft and the tap, and means on the support for normally locking one of the gears of the train against rotation, and common means on the support for automatically effecting release of said locking means and for establishing driving connection between said drive gear of the work and another gear of said train.

11. A tapping attachment for lathes of the type in which the work is associated with a drive shaft permanently rotated, and a support for the tap is movable axially of the work, comprising a stop adjustably mounted on the lathe, a casing forming part of said support and containing a pair of gears, a countershaft loosely associated with one of said gears, a clutch lever mounted on said casing, a sliding element flexibly associated with said clutch lever and adapted to engage the stop upon advance of the support in direction towards the work, a clutch under control of said lever on the countershaft loosely mounted in said support and loosely associated with one of the gears in said support, a locking element for the other gear in said support, said locking element being operatively connected with said lever, whereby upon engagement of said sliding element with said support said lever is imparted a rocking movement to move the clutch on the countershaft to operative position and to move the locking element in the support to inoperative position.

12. A tapping attachment for lathes having a drive shaft permanently associated with the work and a support for the tap movable axially of the work, a gear in said support fixedly associated with the tap, a locking element for said gear, a countershaft loosely mounted in said support, another gear loosely related to said countershaft for said support and in engagement with said first named gear, a stop on the lathe, a slidable element carried by said support and adapted for cooperation with said stop, a clutch lever flexibly associated with said slidable element and pivotally carried on the support, a clutch on the countershaft permanently engaged by said lever, a locking member for said first named gear within the support and connected with said lever, whereby upon displacement of said slidable element by said stop said lever is rocked to move the clutch to operative position relatively to said loose gear, and said locking element is withdrawn from engagement with said tap gear, means for retaining said lever in either of its terminal positions and a clutch on said countershaft for operatively connecting the same automatically during the advance of the support in direction towards the work with the drive shaft of the work.

13. A tapping attachment for lathes having a drive shaft for the work and a rotatable turret on which the support for the tap is mounted, a train of gears between said drive shaft and the tap, means for normally locking one of said gears in the train of gears against rotation, means for automatically establishing driving relation throughout said train of gears, and means operative upon rotation of the turret from tapping position to another operative position for reestablishing the locking operation for said gear in the train of gears.

14. A tapping attachment for lathes having a drive shaft for permanently rotating the work, and a turret axially and rotatably movable of the work, a train of gears interposed between the drive shaft and the tap, means for rendering normally one of the gears of the train inoperative, a stop on the lathe, and means controlled by the advance of the turret in a direction towards the work for establishing driving relation of said gear to other gears of the train, and means operative upon rotation of the turret for interrupting automatically the driving relation of said gear.

15. A tapping attachmenet for lathes, in which the work is permanently driven by a drive shaft and in which the tap is carried by a support mounted on a turret which is axially movable of the work and rotatable on the lathe comprising a train of gears interposed between the drive shaft and the tap, means for normally rendering one of said gears inoperative as to driving relation to other gears, means for normally locking another one of said gears positively against rotation, means operative automatically upon advance of the turret to a predetermined point for automatically establishing the driving relation of said first named gear and for withdrawing the lock from said second named gear, and means operative upon rotation of said turret from a predetermined position for interrupting the driving relation of said first named gear and for positively again locking said second gear.

16. A tapping attachment for lathes in which the work is permanently driven by a drive shaft and in which the tap is carried by a support mounted on a turret which is axially movable of the work and rotatable on the lathe, comprising a gear casing fixedly mounted on the turret and rotatably supporting two intermeshing gears, one of which supports the tap, a driving gear rotatable with the work, a second gear in permanent driven engagement with said last named gear, a shaft loosely extending rotatably and slidably through one of the gears in the casing carried by the turret, a clutch member fixedly mounted on said last named shaft, one of the gears operable with the work having a companion clutch member, a second clutch member mounted on said shaft supported in the gear casing to be rotatable therewith and slidable thereon, a companion clutch member on one of the gears in said casing, and means supported on said casing for operatively connecting said second clutch member on the shaft with the companion clutch member on the gear subsequently to the engagement of the first mentioned clutch members, and said clutch operating means being dependent upon the movement of the gear casing relatively to a fixed point on the lathe.

17. A tapping attachment for lathes in which the work is permanently driven by a shaft having a gear associated therewith to rotate with the speed of the work and in which the tap is supported by a turret axially movable of the work, including a fixed stem projecting from the turret, a gear casing fixedly mounted on said stem and containing two intermeshing gears of equal diameter in vertical alignment with each other, the lower gear being rotatable on said fixed stem and carrying in fixed relation and in alinement with said stem the tap, said last named gear having a clutch face, a key slidable on said stem and adapted to engage said clutch face for holding said gear positively against rotation, means mounted on the gear casing of the turret for releasing said key from holding engagement with said gear when the turret has been advanced to a predetermined point, and means constrained to exert a driving force upon said gear after release of the holding key therefrom, said driving means for said gear being constrained to exert the driving force during the advance of the turret towards the point and being released fully to exert their driving force subsequent to the release of said key from said gear.

18. A tapping attachment for lathes, in which the work is permanently driven by a shaft operating a gear at the same speed as the work, a turret rotatable on the lathe and axially movable of the shaft, a gear casing fixed to said turret and containing two intermeshing gears, one of which is fixedly connected with the tap while the other one loosely supports for slidable and rotational movement a countershaft, means in the casing for positively locking said gears, means on the outside of the casing for exerting a driving force upon the countershaft, additional means outside the casing for establishing driving connection between the countershaft and the gear in the casing, through which said countershaft extends, means for releasing the lock of the gears upon arrival of the turret at a predetermined point in its path of axial movement, and means for reestablishing said locking connection for the gears upon arrival of said turret at a predetermined point in its path of rotational movement.

19. A tapping attachment for lathes, in which the work is permanently driven by a shaft, and in which the tap is carried by a turret, including a casing mounted on the turret and containing a set of intermeshing gears, one of which is fixedly associated with the tap while the other one loosely supports for sliding and rotary movement a countershaft, means under control of the work for imparting a rotary movement to said countershaft upon axial advance of the turret beyond a predetermined point in its path of axial movement, and means dependent upon the axial movement of the turret beyond another predetermined point in its path for connecting said countershaft with one of the gears in said casing for driving the tap.

In testimony whereof I affix my signature at 10 S. La Salle St., Chicago, Illinois.

OLAF HEGSTAD.